United States Patent
Kang et al.

[19]

[11] Patent Number: 5,907,953
[45] Date of Patent: Jun. 1, 1999

[54] TEMPERATURE CONTROLLING METHOD AND APPARATUS FOR REFRIGERATOR USING VELOCITY CONTROL OF ROTARY BLADE

[75] Inventors: Yun-seok Kang; Hae-jin Park, both of Suwon-city, Rep. of Korea

[73] Assignee: Samsung Electronics Co., Ltd., Kyungki-do, Rep. of Korea

[21] Appl. No.: 08/825,178

[22] Filed: Mar. 27, 1997

[30] Foreign Application Priority Data

Apr. 29, 1996 [KR] Rep. of Korea ...................... 96-13551
Apr. 29, 1996 [KR] Rep. of Korea ...................... 96-13552

[51] Int. Cl.$^6$ .................................................. F25D 17/06
[52] U.S. Cl. .................................. 62/89; 62/186; 62/408; 62/209
[58] Field of Search ................................ 62/186, 89, 408, 62/407, 177, 179, 187, 413, 414, 415, 416, 178, 208, 209, 203

[56] References Cited

U.S. PATENT DOCUMENTS

| | | | |
|---|---|---|---|
| 4,738,116 | 4/1988 | Himeno et al. | 62/186 |
| 5,251,814 | 10/1993 | Warashina et al. | 62/186 X |
| 5,261,247 | 11/1993 | Knezic et al. | 62/117 |
| 5,269,152 | 12/1993 | Park | 62/89 |

FOREIGN PATENT DOCUMENTS

0 713 064   5/1996   European Pat. Off. .
0 716 278   6/1996   European Pat. Off. .

*Primary Examiner*—Harry B. Tanner
*Attorney, Agent, or Firm*—Burns, Doane, Swecker & Mathis, LLP

[57] ABSTRACT

A temperature controlling method and apparatus for a refrigerator by controlling the velocity of a rotary blade are provided. In the temperature controlling method, a fuzzy model for inferring an equilibrium velocity corresponding to the rotation velocity of the rotary blade, required for the temperature equilibrium within a refrigeration compartment, is constituted and then the fuzzy inference is performed based on the fuzzy model using the change in temperature measured at a predetermined number of portions within the refrigeration compartment to calculate the equilibrium velocity, thereby controlling the rotation velocity of the rotary blade according to the calculated equilibrium velocity. Accordingly, temperatures of each portion are accurately inferred from the fuzzy model using the values of temperature changes sensed by only a small number of temperature sensors and then the rotation velocity of the rotary blade is appropriately controlled according to the inferred positions into which cool air is to be discharged. As a result, the cool air is appropriately discharged into each portion according to the distance between the rotary blade and a target position, so that the optimal temperature equilibrium is obtained in the refrigeration compartment.

14 Claims, 8 Drawing Sheets

TEMPERATURE CONTROLLING METHOD AND APPARATUS FOR REFRIGERATOR USING VELOCITY CONTROL OF ROTARY BLADE

BACKGROUND OF THE INVENTION

The present invention relates to a temperature controlling method and apparatus for a refrigerator in which temperature of a refrigeration compartment is evenly controlled by precisely discharging cool air into a position to be cooled according to the distance from a rotary blade thereto by a fuzzy inference and the learning by a neuron network.

Generally, since the load of the items being refrigerated is different at different portions of the refrigeration compartment in a refrigerator, particularly, in a large refrigerator, it is difficult to evenly maintain temperature within the refrigeration compartment. Accordingly, research into a method for evenly controlling the temperature of the refrigeration compartment has been performed as the storage capacity inside the refrigerator increases. In one such method, the discharge of cool air is controlled by rotating a rotary blade attached to the rear wall of the refrigeration compartment. Here, the cool air is discharged into a high-temperature portion to even out the temperature within the refrigeration compartment. The rotary blade determines a cool air discharge direction according to its stationary position (a predetermined stationary angle) or continuously rotates at a constant velocity to discharge cool air like a ventilation fan.

However, since the ventilation force by the rotation of the rotary blade is constant in a refrigerator having the rotary blade, the discharge of cool air cannot be controlled according to the distance from the rotary blade to a target area to be cooled. In other words, when intending to discharge cool air to a front portion of the refrigeration compartment, far from the rotary blade, the rotation velocity of the rotary blade should be increased to discharge the cool air into the front portion. Meanwhile, when intending to discharge cool air to a rear portion of the refrigeration compartment, near the rotary blade, the cool air discharging velocity should be reduced by rotating the rotary blade at a low velocity or stopping the rotation of the rotary blade altogether. However, the conventional rotary blade cannot appropriately control the cool air discharging velocity due to the constant rotation velocity thereof.

Also, as a precondition for controlling the cool air discharging velocity through the controlling of the rotation velocity of the rotary blade, temperatures of each portion should be precisely measured according to the distance from the rotary blade to each portion. However, in the conventional refrigerator having only two temperature sensors positioned at upper and lower portions of the refrigeration compartment, it is difficult to precisely measure the temperatures of each portion. Also, even though the temperatures of each portion are inferred by the fuzzy inference to some degree of accuracy, the conventional refrigerator cannot correct specific errors of every product, which may occur during the mass production thereof, so that there are limitations to the accuracy of the inference.

SUMMARY OF THE INVENTION

It is an object of the present invention to provide a temperature controlling method and apparatus for a refrigerator in which temperatures of each portion within a refrigeration compartment are precisely inferred using a small number of temperature sensors and a rotation velocity of a rotary blade is controlled according to the inferred temperatures, so that cool air is evenly discharged according to the distance from a rotary blade to each portion within the refrigeration compartment.

According to an aspect of the present invention, there is provided a temperature controlling method for a refrigerator in which a cool air discharging velocity into a refrigeration compartment is controlled according to a rotation velocity of a rotary blade to evenly discharge cool air according to the distance from the rotary blade to a target portion to be cooled, the temperature controlling method comprising the steps of: (a) constituting a fuzzy model for inferring the highest temperature portion among a plurality of portions within the refrigeration compartment; (b) measuring changes in temperatures at a predetermined number of the portions; (c) performing the fuzzy inference using the measured values of changes in temperatures based on the fuzzy model constituted in the step (a) to infer a temperature-equilibrating position into which the cool air is discharged and calculating the optimal equilibrium velocity of the rotary blade, the optimal equilibrium velocity required for discharging the cool air into the temperature-equilibrating position; and (d) controlling the rotation velocity of the rotary blade according to the equilibrium velocity calculated in the step (c).

According to the present invention, the step (a) may comprise the sub-steps of: (a-1) providing data of the values in the temperature changes sensed by temperature sensors of the refrigeration compartment and distances from the rotary blade; (a-2) performing a fuzzy division based on the data obtained in the step (a-1); (a-3) selecting the optimal structure among a plurality of divided structures corresponding to the fuzzy-divided areas; (a-4) calculating a linear formula for inferring the highest temperature portion based on the optimal structure selected in the step (a-3), wherein the temperature within the refrigeration compartment is precisely inferred using the Takagi-Sugeno-Kang (TSK) fuzzy model.

Also, the step (d) may comprise the sub-steps of: (d-1) generating an AC voltage having an effective value corresponding to the maximum rotation velocity of the rotary blade; (d-2) calculating an equilibrium voltage having an effective value corresponding to the equilibrium velocity; (d-3) cutting the waveform of the AC voltage by a predetermined interval to generate the equilibrium voltage; and (d-4) applying the equilibrium voltage to a driving motor for driving the rotary blade, whereby the velocity of the driving motor is easily controlled by a required voltage from the maximum voltage.

Here, the step (d-3) may comprise the sub-steps of: (d-3-1) detecting a zero crossing point from the waveform of the AC voltage; (d-3-2) calculating a delay time, during which the waveform of the AC voltage is to be cut to generate the equilibrium voltage, from the zero crossing point; and (d-3-3) cutting the waveform during the delay time calculated in the step (d-3-2) from the zero crossing point, whereby a hardware therefor is easily achieved.

In the temperature controlling method, the method may further comprise the steps of: detecting the real rotation velocity of the rotary blade; calculating the difference between the real rotation velocity and the equilibrium velocity; and controlling the real rotation velocity of the rotary blade by reflecting the calculated velocity difference into the equilibrium velocity so that the real rotation velocity reaches the equilibrium velocity, whereby the rotation velocity of the rotary blade is much precisely controlled.

As another aspect of the present invention, there is provided a temperature controlling apparatus for a refrigerator in which a cool air discharging velocity into a refrigeration compartment is controlled according to a rotation velocity of a rotary blade to distribute cool air according to the distance from the rotary blade to a target portion to be cooled, the temperature controlling apparatus comprising: means for sensing change in temperatures at a predetermined number of portions within the refrigeration compartment; fuzzy inference means for performing a fuzzy inference according to the temperature changes sensed by the temperature sensing means to infer an equilibrium velocity corresponding to the optimal rotation velocity of the rotary blade, the optimal rotation velocity required for maintaining temperature equilibrium within the refrigeration compartment; and means for controlling the rotation velocity of the rotary blade according to the equilibrium velocity.

According to the present invention, the controlling means may comprise: a power source for providing an AC voltage having an effective value corresponding the maximum rotation velocity of the rotary blade; an equilibrium voltage generator for generating an equilibrium voltage having an effective value corresponding to the equilibrium velocity by cutting the AC voltage by a predetermined interval; and a driving motor for driving the rotary blade according to the equilibrium voltage.

Also, preferably, the equilibrium voltage generator comprises: a zero crossing point detector for detecting a zero crossing point from the AC voltage; a delay time calculator for calculating a delay time from the zero crossing point during which the waveform of the AC voltage is to be cut, to generate the equilibrium voltage; and waveform cutting means for cutting the waveform of the AC voltage from the zero crossing point during the delay time.

Also, preferably, the waveform cutting means comprises: a TRIAC connected to the power source in series; and trigger means for applying a trigger signal to a gate port of the TRIAC after the delay time.

Also, preferably, the temperature controlling apparatus further comprises: means for detecting the real rotation velocity of the rotary blade; and means for calculating the difference between the real rotation velocity and the equilibrium velocity, wherein the controlling means controls the real rotation velocity of the rotary blade by reflecting the difference into the equilibrium velocity.

BRIEF DESCRIPTION OF THE DRAWINGS

The above object and advantages of the present invention will become more apparent by describing in detail a preferred embodiment thereof with reference to the attached drawings in which.

DETAILED DESCRIPTION OF THE INVENTION

Figure 1:
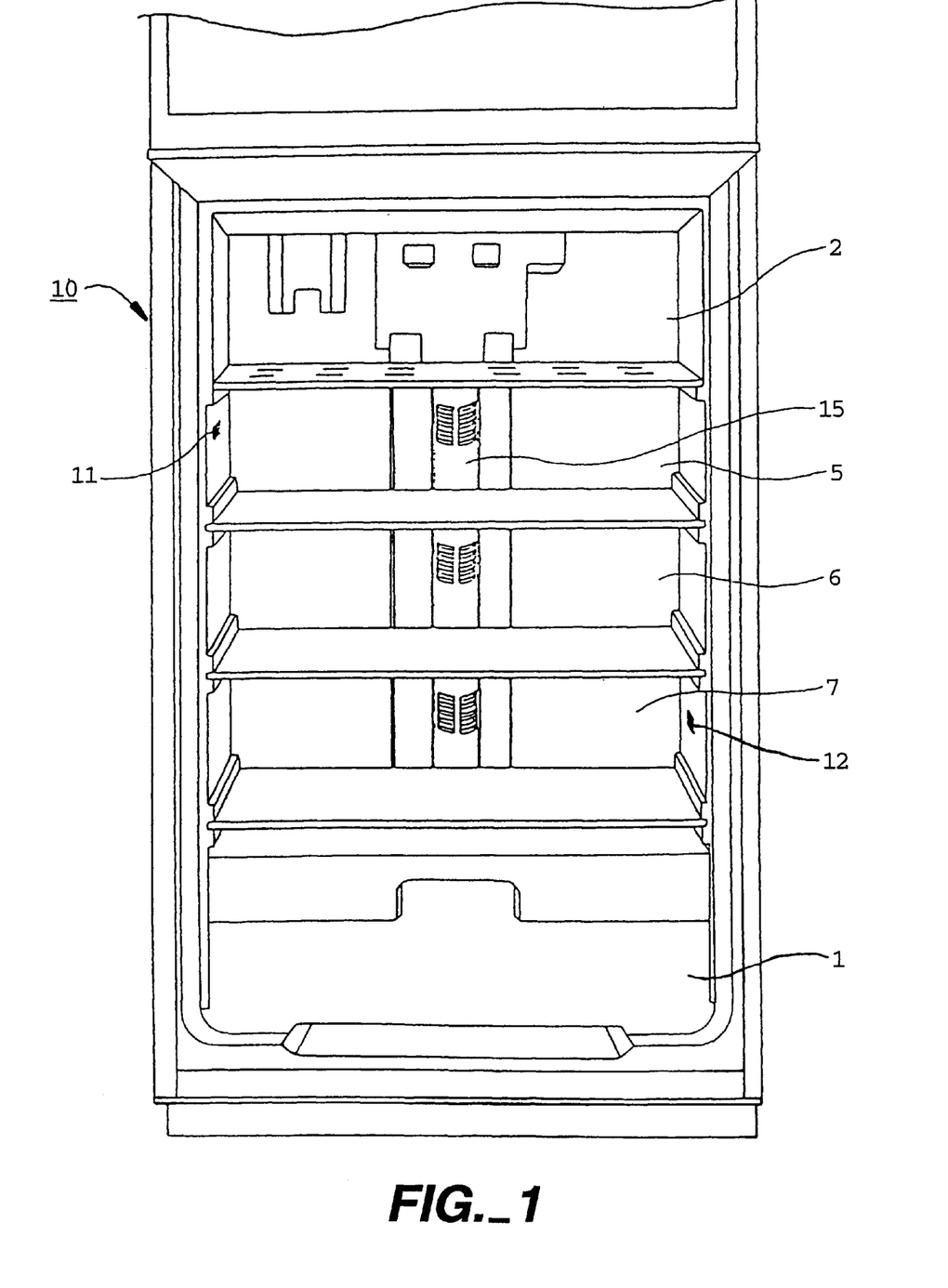
FIG. 1 is a perspective view showing the inside of a refrigerator.

As shown in FIG. 1, a refrigeration compartment 10 of a refrigerator is generally located at the lower portion of the refrigerator. The refrigeration compartment 10 is partitioned and the lowermost portion of the partitioned refrigeration compartment 10 is used as a crisper 1. Generally, the refrigeration compartment 10 exclusive of the crisper 1 is partitioned into four portions, wherein an uppermost portion 2 is generally called a fresh compartment. Here, the remaining portions will be called first, second and third portions 5, 6 and 7 from the top down. Also, considering that the height of the refrigeration compartment 10 is "H", the first, second and third portions 5, 6 and 7 are called 3H/4, 1H/2 and 1H/3 rooms, respectively. Two temperature sensors are placed in the refrigerator compartment 10, wherein an S1 temperature sensor 11 for sensing the temperature of the upper left portion of the refrigeration compartment 10 is attached at the left wall of the first portion 5 (i.e., 3H/4 room) and an S2 temperature sensor 12 for sensing the temperature of the lower right portion of the refrigeration compartment 10 is attached at the right wall of the third portion 7 (i.e., 1H/3 room). In addition, a cool air discharging portion 15 is at the center of the rear wall of the refrigeration compartment 10. Here, the discharge of cool air from the cool air discharging portion 15 is controlled by a rotary blade 20 shown in FIG. 2.

Figure 2:
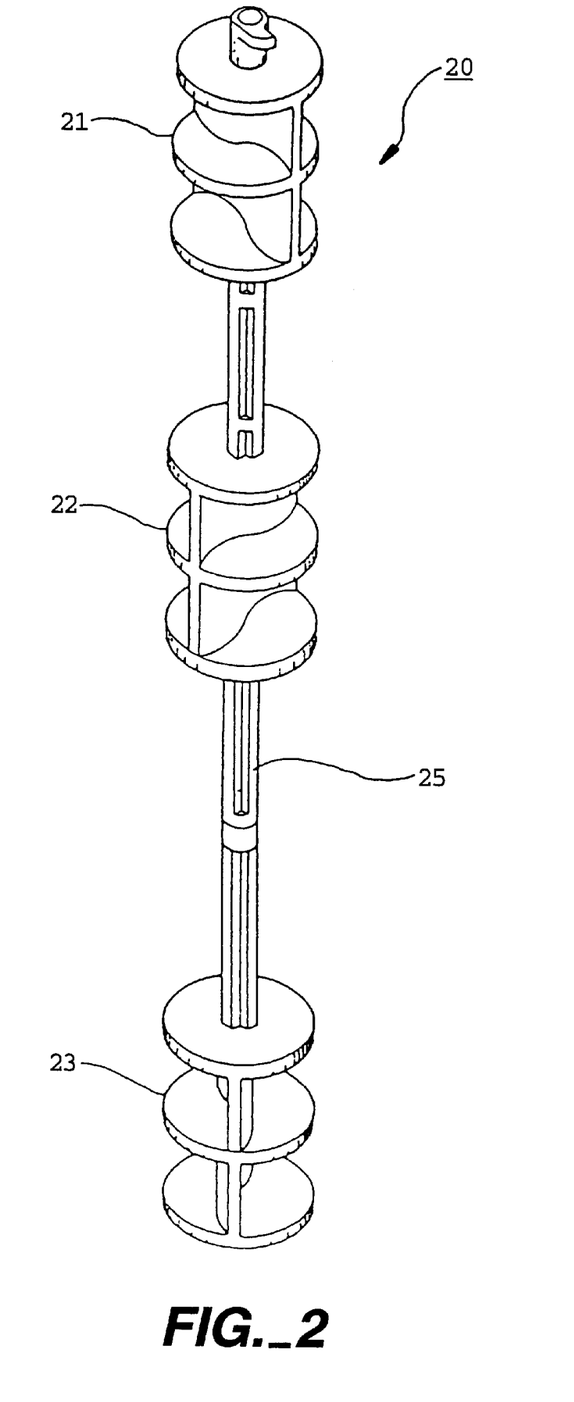
FIG. 2 is an enlarged perspective view of a rotary blade.

Referring to FIG. 2, the rotary blade 20 includes an upper blade 21, a middle blade 22 and a lower blade 23, corresponding to the first, second and third portions 5, 6 and 7. The upper, middle and lower blades 21, 22 and 23 rotate integrally centered around a rotary shaft 25. The upper, middle and lower blades 21, 22 and 23 are displaced from each other by 60°, directing air at different directions. Also, an evaporator (not shown) is installed at the rear side of the rotary blade 20 in the refrigeration compartment 10. The discharge velocity of the cool air, from the evaporator into portions 5, 6 and 7, is controlled according to the rotation velocity of the rotary blade 20.

The rotary blade 20 can ventilate the cool air while being pointed toward a predetermined direction to intensively discharge the cool air into a high-temperature portion. Also, the rotary blade 20 can continuously rotate during the refrigeration of the refrigerator to evenly discharge the cool air over the entire refrigeration compartment 10. When the rotary blade 20 rotates rapidly, the cool air is discharged to a front portion of the refrigeration compartment 10, far from the rotary blade 20. Meanwhile, the cool air is discharged only to a rear portion of the refrigeration compartment 10, near the rotary blade 20 when the rotary blade 20 rotates slowly.

Figure 3:
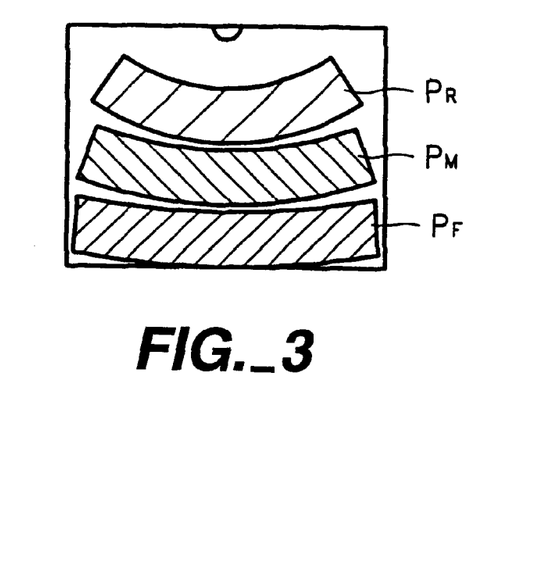
FIG. 3 is a cross-sectional view illustrating the discharge of cool air into portions of a refrigeration compartment, which are separated from the rotary blade by different distances, by controlling the rotation velocity of the rotary blade.
Figure 4:
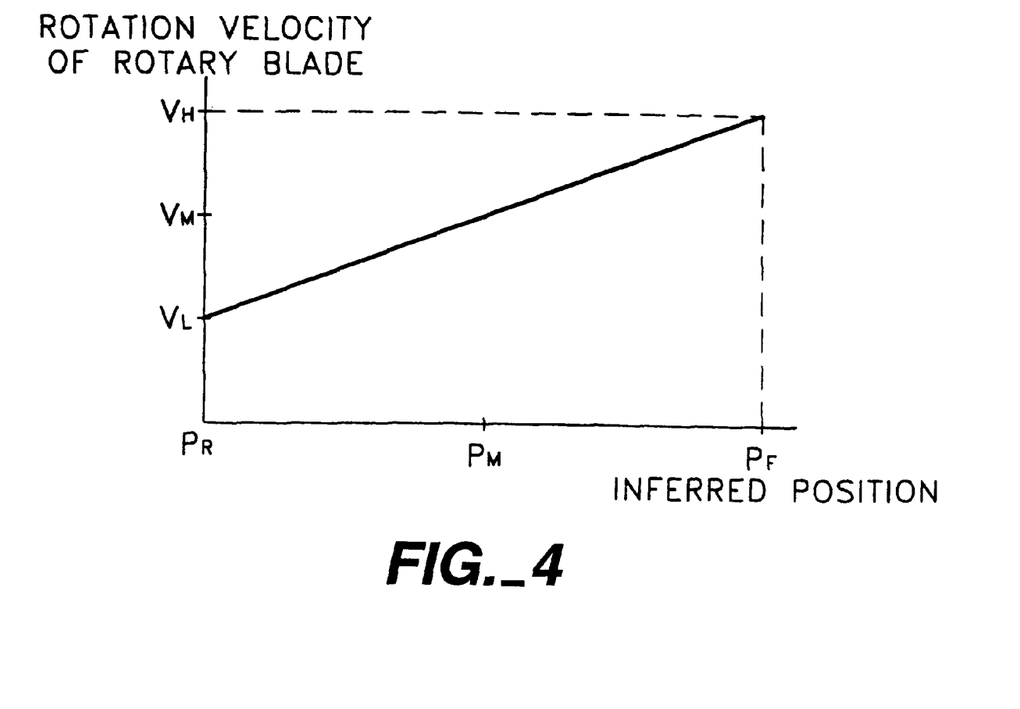
FIG. 4 is a graph showing the rotation velocity of the rotary blade according to the distance from the rotary blade.

FIG. 3 is a cross-sectional view illustrating the discharge of cool air into portions of a refrigeration compartment, which are separated from the rotary blade by different distances, by controlling the rotation velocity of the rotary blade. FIG. 4 is a graph showing the rotation velocity of the rotary blade according to the distance from the rotary blade.

In FIG. 3, $P_R$ represents a rear portion of the refrigeration compartment which is near the rotary blade, $P_F$ represents a front portion of the refrigeration compartment which is far from the rotary blade, and $P_M$ represents a middle portion between the rear and front portions. In FIG. 4, cool air is discharged to the $P_R$ when the rotary blade rotates at a low velocity $V_L$, cool air is discharged to $P_M$ when the rotary blade rotates at a middle speed $V_M$, and cool air is discharged to $P_F$ when the rotary blade rotates at a high speed $V_H$. The rotation velocity of the rotary blade is controlled such that cool air reaches a portion which is inferred as the highest temperature portion, so that the controlled rotation velocity has continuity.

The present invention is for maintaining an even temperature throughout the refrigeration compartment, for which the temperatures of each portion of the refrigeration compartment are inferred and then a learning is performed based on the data of the inferred temperature to discharge cool air into the highest temperature portion. The present invention can be achieved by the following three steps.

First, temperatures of a plurality of portions in the refrigeration compartment 10, which are separated from the rotary blade 20 by different distances, are inferred using the temperatures detected by two temperature sensors S1 and S2 according to the fuzzy inference based on the Takagi-Sugeno-Kang (TSK) fuzzy model.

Second, positions corresponding to the temperatures inferred by the fuzzy model are corrected by a neural network to more accurately calculate the positions to be cooled. That is, the neural network is constructed by taking the temperature values sensed by the two temperature sensors S1 as input nodes and S2 and the highest temperature position (hereinafter referred to as "temperature-equilibrating position") within the refrigeration compartment 10 as an output node. Then, the temperature-equilibrating position is compared with the inferred position by means of learning by the neural network, thereby more accurately calculating the temperature-equilibrating position.

Third, the rotation velocity of the rotary blade 20 is controlled to discharge cool air at a predetermined optimal velocity for reaching the calculated temperature-equilibrating position. The waveform of voltage applied to a driving motor for driving the rotary blade 20 is partly cut off by a predetermined interval to reduce effective value of the voltage, thereby slowing down the rotation velocity of the rotary blade.

Hereinafter, the above three steps will be described in detail.

First, the TSK fuzzy model in the fuzzy inference step will be described as follows.

For the fuzzy inference, a plurality of data with respect to a plurality of variables are required. Examples of the data are shown in Table 1.

TABLE 1

| No. | X1 | X2 | X3 | Y | No. | X1 | X2 | X3 | Y |
|---|---|---|---|---|---|---|---|---|---|
| 1 | 1 | 3 | 1 | 11.11 | 21 | 1 | 1 | 5 | 9.545 |
| 2 | 1 | 5 | 2 | 6.521 | 22 | 1 | 3 | 4 | 6.043 |
| 3 | 1 | 1 | 3 | 10.19 | 23 | 1 | 5 | 3 | 5.724 |
| 4 | 1 | 3 | 4 | 6.043 | 24 | 1 | 1 | 2 | 11.25 |
| 5 | 1 | 5 | 5 | 5.242 | 25 | 1 | 3 | 1 | 11.11 |
| 6 | 5 | 1 | 4 | 19.02 | 26 | 5 | 5 | 2 | 14.36 |
| 7 | 5 | 3 | 3 | 14.15 | 27 | 5 | 1 | 3 | 19.61 |
| 8 | 5 | 5 | 2 | 14.36 | 28 | 5 | 3 | 4 | 13.65 |
| 9 | 5 | 1 | 1 | 27.42 | 29 | 5 | 5 | 5 | 12.43 |
| 10 | 5 | 3 | 2 | 15.39 | 30 | 5 | 1 | 4 | 19.02 |
| 11 | 1 | 5 | 3 | 5.724 | 31 | 1 | 3 | 3 | 6.38 |
| 12 | 1 | 1 | 4 | 9.766 | 32 | 1 | 5 | 2 | 6.521 |
| 13 | 1 | 3 | 5 | 5.87 | 33 | 1 | 1 | 1 | 16 |
| 14 | 1 | 5 | 4 | 5.406 | 34 | 1 | 3 | 2 | 7.219 |
| 15 | 5 | 1 | 3 | 10.19 | 35 | 1 | 5 | 3 | 5.724 |
| 16 | 5 | 3 | 2 | 15.39 | 36 | 5 | 1 | 4 | 19.02 |
| 17 | 5 | 5 | 1 | 19.68 | 37 | 5 | 3 | 5 | 13.39 |
| 18 | 5 | 1 | 2 | 21.06 | 38 | 5 | 5 | 4 | 12.68 |
| 19 | 5 | 3 | 3 | 14.15 | 39 | 5 | 1 | 3 | 19.61 |
| 20 |   | 5 | 4 | 12.68 | 40 | 5 | 3 | 2 | 15.39 |

In Table 1, there are three input variables of X1, X2 and X3 and an output variable of Y, wherein the numerical relation between the input variables and the output variable are obtained by a real measurement. An ultimate object of the TSK fuzzy inference is to express a linear relationship between the input variables and the output variable with a numerical formula using the plurality of measured values. Thus, a linear formula expressing the relationship between the input and output variables is expressed as follows:

$$Y = a_0 + a_1 X1 + a_2 X2 + a_3 X3 + a_4 X4 \quad (1)$$

As shown in Table 1, the output values according to changes in the input variables are different according to the degree of contribution of each input variable to the entire output value, and the degree of the difference of the output values is expressed as coefficients $a_1$, $a_2$, $a_3$ and $a_4$ of the input variables X1, X2, X3 and X4, respectively. Here, each input variable is expressed as follows.

$$X1 = S2(k) - S1(k)$$

$$X2 = S2(k-1) - S1(k-1)$$

$$X3 = S2(k-2) - S1(k-2)$$

where S1(k) and S2(k) are current measured temperature values, S1(k-1) and S2(k-1) are temperature values measured 1 minute ago, and S1(k-2) and S2(k-2) are temperature values measured 2 minutes ago, wherein the temperatures are measured by two temperature sensors S1 and S2, respectively.

Hereinafter, the fuzzy inference step will be described by stage.

STAGE 1

First, a linear formula representing the relationship between the input and output variables is obtained using the data shown in Table 1. Here, a minimum square method for the numerical analysis is used and the variables having a smaller degree of contribution are considered to the minimum using a variable decreasing method based on an error rate, thereby resulting in the following formula (2).

$$Y = 15.3 + 1.97 X1 - 1.35 X2 - 1.57 X3 \quad (2)$$

The formula (2) is similar to the above formula (1), however, the formula (2) is a basic formula, and not final, for constructing the fuzzy model for the fuzzy inference. The data area is divided on the basis of a variable having the highest degree of contribution based on the formula (2), resulting in the optimal linear formula in which the degree of contribution of each variable is appropriately expressed. As shown in the formula (2), the input parameter X4 is eliminated from the above formula (2) according to an algorithm based on the variable decreasing method.

As a method for modeling the relationship between the input and output variables of a nonlinear system into a polynomial expression having the input variables, an unbiasedness criterion is applied to the formula (2). To obtain the value UC of the unbiasedness criterion, the entire data is divided into two groups A and B and then substituted for the variables of the following formula (3).

$$UC = \left[\sum_{i=1}^{n_A}(y_i^{AB}-y_i^{AA})^2 + \sum_{i=1}^{n_B}(y_i^{BA}-y_i^{BB})^2\right]^{\frac{1}{2}} \quad (3)$$

here $n_A$ represents the number of data in group A, $n_B$ represents the number of data in group B, $y_i^{AA}$ represents an output estimated from group A by the fuzzy model which is obtained by group A, $Y_i^{AB}$ represents an output estimated from group A by the fuzzy model which is obtained by group B, $Y_i^{BB}$ represents an output estimated from group B by the fuzzy model which is obtained by group B, $Y_i^{BA}$ represents an output estimated from group B by the fuzzy model which is obtained by group A, the first term represents the difference between the estimated outputs between the groups A and B with respect to the input data of the group A, and the second term represents the difference between the estimated outputs between the groups A and B with respect to the input data of the group B. The UC obtained from the above is called UC(1). The UC obtained from the data shown in Table 1 is as follows.

$$UC(1)=3.8 \quad (4)$$

STAGE 2

A fuzzy model accompanying two plant rules is established. Here, the structure of a precondition part corresponding to the "if" part of the "if-then" rule of the fuzzy model should be established. In the establishment of the structure, the selection of variables and fuzzy division are considered simultaneously.

First, a structure having one of variables X1, X2, X3 and X4 as a variable of the precondition part is premised and the data area is divided into two. Thus, four structures are considered for the precondition part.

For example, the first structure has a fuzzy model accompanying the following two plant rules:

L1: if X1=SMALL, then $Y_{11}$=−0.536+0.451X1+0.771X2+0.128X3

L2: if X1=BIG, then $Y_{12}$=0.141+1.055X1−0.041X2+0.981X3.

Also, the second structure has a fuzzy model accompanying the following two plant rules:

L1: if X2=SMALL, then $Y_{11}$=−1.656+0.429X1+0.848X2+0.69X3

L2: if X2=BIG, then $Y_{12}$=−0.006+1.336X1−0.189X2+0.768X3.

The parameters for the precondition part having the above structure are established, and then a structure and parameters of the conclusion part are established based on the established precondition part. The UC values for the above four structures can be calculated as follows.

UC(2-1)=5.4

UC(2-2)=3.5

UC(2-3)=3.3

UC(2-4)=4.6 where the first numeral inside the parenthesis means a fuzzy division-into-two, and the second numeral represents the index of the variable. For example, UC(2-4) indicates the UC value when the fuzzy division-into-two is performed on the basis of the variable X4.

Comparing the above four UC values, UC(2-3) is the smallest, so that a fuzzy model is constructed on the basis of the variable X3 as follows.

L1: If X3=SMALL then Y1=3.13X1−1.91X2+13.6X3

L2: If X3=BIG then Y2=8.92+1.84X1−1.32X2+0.14X3

STAGE 3

The variable X3 is included in the precondition part of the STAGE 2, a fuzzy division-into-three is performed on the basis of the variable X3. That is, the variable having the least UC value in the STAGE 2 is preferentially added to the fuzzy division-into-three.

Figure 5A:
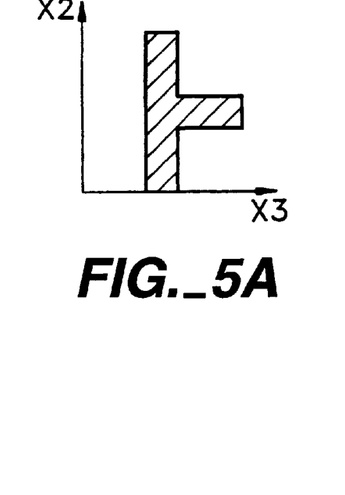
FIGS. 5A, 5B and 5C are graphs each showing the divided structure when the data shown in Table 1 is fuzzy-divided into three.
Figure 5B:
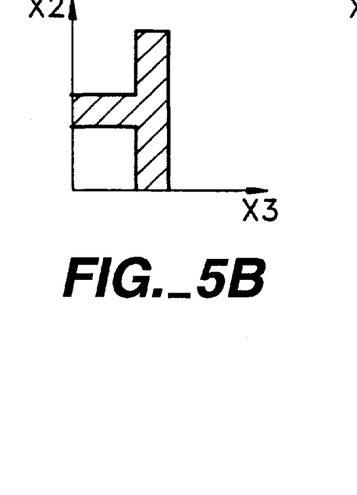
Figure 5C:
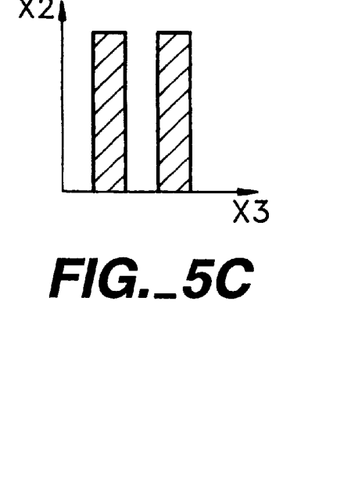

Three structures as shown in FIGS. 5A to 5C can be considered for the structures of the divided data area of the precondition part. For example, the third structure (see FIG. 5C) is as follows.

L1: if X3=SMALL, then Y=−0.536+0.451X1+0.771X2+0.128X3

L2: if X3=MEDIUM, then Y=0.512+0.989X1+1.241X2+0.212X3

L3: if X3=BIG, then Y=0.141+1.051X1−0.041X2+0.105X3

The structure and variables of the conclusion part based on the precondition part having the above structure are established, and then the UC values can be calculated. As a result, it can be shown that the first structure has the least UC value. Thus, a fuzzy model is constructed on the basis of the first structure as follows.

L1: If X3=SMALL then Y1=20.5+3.3X1−1.85X3−4.98X3

L2: If X3=BIG and X2=SMALL then Y2=12.7+2.98X1−0.56X3

L3: If X3=BIG and X2=LARGE then Y3=7.1+1.82X1−0.34X2−0.42X3

The above data division structure is a fuzzy model for the STAGE 3.

STAGE 4

The above fuzzy division and calculation of the UC values with respect to each division structure are repeated. This repetition is performed until the least UC value is obtained. When the least UC value is obtained, the corresponding structure is selected as the optimal structure, and then a formula for the conclusion part is obtained. Thus, it is regarded that the obtained formula of the conclusion part reflects the degree of contribution of each variable at the optimum level.

Hereinafter, a process for obtaining a linear formula from the above conclusion part of the "if-then" rule will be described.

In order to obtain the fuzzy model for estimating the distribution of temperature within the refrigeration compartment using the temperatures measured by the S1 and S2 temperature sensors 11 and 12 of FIG. 1, data reflecting the temperature change at various positions separated from the rotary blade by different distances in the respective upper and lower positions is required.

Figure 6A:
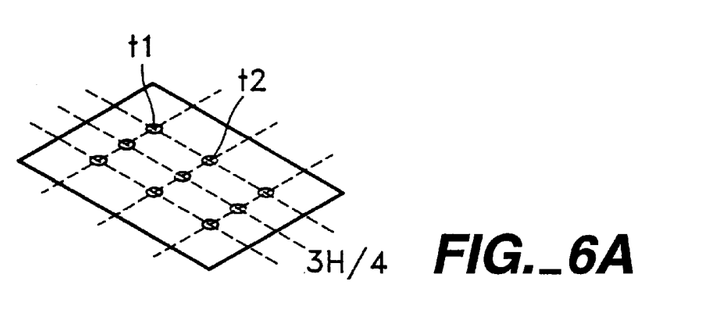
FIG. 6 is a schematic perspective view showing the portion on respective shelves where temperatures are to be measured.
Figure 6B:
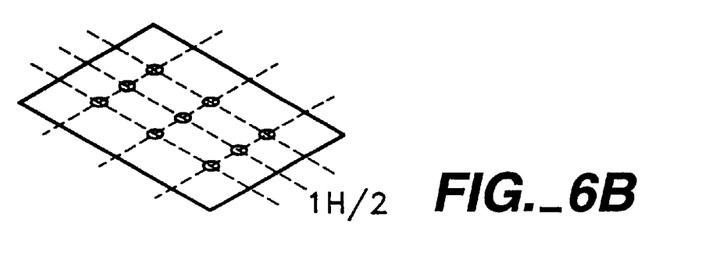
Figure 6C:
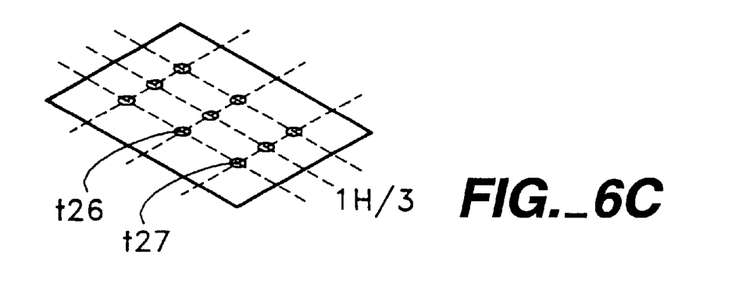

FIG. 6 shows portions on respective shelves where temperatures are to be measured, wherein a total of 27 positions by nine (3×3) on each shelf positioned at the heights of 3H/4, 1H/2 and 1H/3 are shown. Here, the 27 positions are referred to as t1 through t27. First, the difference between the temperatures is measured by two temperature sensors S1 and S2, and changing values in the temperature differences at the 27 positions with lapse of time are recorded in a table. The obtained table is similar to the above Table 1. The table shows the temperature variation rate of the 27 positions with respect to the differences in temperatures measured by the temperature sensors S1 and S2, which is required to construct the fuzzy model for the fuzzy inference of the present invention.

Here, input variables X1, X2 and X3 are expressed as follows, which are temperature differences at the 27 positions (t1 through T27) with lapse of time.

$$X1 = S2(k) - S1(k)$$

$$X2 = S2(k-1) - S1(k-1)$$

$$X3 = S2(k-2) - S1(k-2)$$

where S1(k) and S2(k) are currently measured temperature values, S1(k-1) and S2(k-1) are temperature values measured 1 minute ago, and S1(k-2) and S2(k-2) are temperature values measured 2 minutes ago, wherein the temperatures are measured by two temperature sensors S1 and S2, respectively. Thus, X1 indicates the difference in the current temperatures measured by the temperature sensors S1 and S2, X2 indicates the difference in the temperatures measured 1 minute ago by the temperature sensors S1 and S2, and X3 indicates the difference in the temperatures measured 2 minutes ago by the temperature sensors S1 and S2, respectively.

Also, an output variable is expressed as the temperature among the 27 positions (t1 through t27) with respect to the input variables X1, X2 and X3. Thus, the data include the differences in temperatures measured by the temperature sensors S1 and S2 and the temperature difference variation rates at the 27 positions with lapse of time.

The above-described TSK fuzzy theory is applied using the table. That is, the fuzzy division-into-two is performed with respect to respective variables and the fuzzy division-into-three is performed on the basis of a variable having the least UC value, so that a fuzzy structure having the least UC value is selected. Then, variables of the precondition part with respect to the selected fuzzy structure are obtained and then an intended final linear formula is constructed according to the obtained variables.

For the sake of explanation, the obtained final fuzzy structure is assumed as follows.

Here, the selected structure and numerical values are assumed in order to express the final formula. Thus, the final fuzzy structure and the numerical value of the formula according to its structure may be different according to experimental data.

L1: If X1=SMALL then Y1 9.03+0.175X1−0.347X2+0.174X3

L2: If X1=MEDIUM then Y2=9.43−2.6955X1+4.042X2−1.041X3

L3: If X1=BIG X2=SMALL then Y3=−15.97+8.82X1−14.12X2+2.528X3

L4: If X1=BIG X2=BIG then Y4=1.1−0.48X1+0.616X2−0.145X3

Here, it is assumed that the optimal structure is obtained by the fuzzy division-into-four, and Y1 through Y4 are linear formulae at each region of the fuzzy structure divided into four. The output Y' is calculated from the above fuzzy model as follows.
When $$g1 = -(|X1+6| - |X1-8|)/14$$

$$g2 = -(|X1-6| - |X1-8|)/11$$

$$W1[1] = 0.5(1+g1)$$

$$W1[2] = 0.5(-g1-g2)$$

$$W1[3] = 0.5(1+g2)$$

$$W2[1] = 0.5(1 - |X2-2| - |X2-16|)/14$$

$$W2[2] = 1 - W2[1],$$

$$Y' = W1[1]Y1 + W1[2]W2[1]Y2 + W1[2]W2[1]Y3 + W1[3]Y4.$$

Here, g1 and g2 represent membership functions of the first and second divided patterns of the above fuzzy model, and W represents a weight of the fuzzy inference, which is added to compensate for the contribution degree of each region with respect to the obtained formula according to a general theory of the TSK fuzzy model. The final output Y' represents a target position into which cool air is to be discharged for optimal temperature equilibrium. Also, the rotation velocity of the rotary blade by which the cool air is discharged toward the target position is calculated by the microprocessor based on the graph shown in FIG. 4.

Hereinafter, the second step of calculating a "temperature-equilibrating position" which indicates a target position into which cool air is discharged for the optimal temperature equilibrium is performed through the learning by the neural network.

The rotation velocity of the rotary blade during a subsequent sampling cycle is calculated from the real values of previous and current temperatures sensed by the temperature sensors S1 and S2 and the previous rotation velocity of the rotary blade. The neural network has four input nodes a1, a2, a3 and a4 and an output node Y. Here, a1 corresponds to the rotation velocity V(k) of the rotary blade during a sampling cycle, and a2, a3 and a4 correspond to the variables X1, X2 and X3 used for the fuzzy inference, respectively. Also, Y represents the temperature-equilibrating position obtained by correcting the target position inferred from the fuzzy inference using the neural network.

Figure 7:
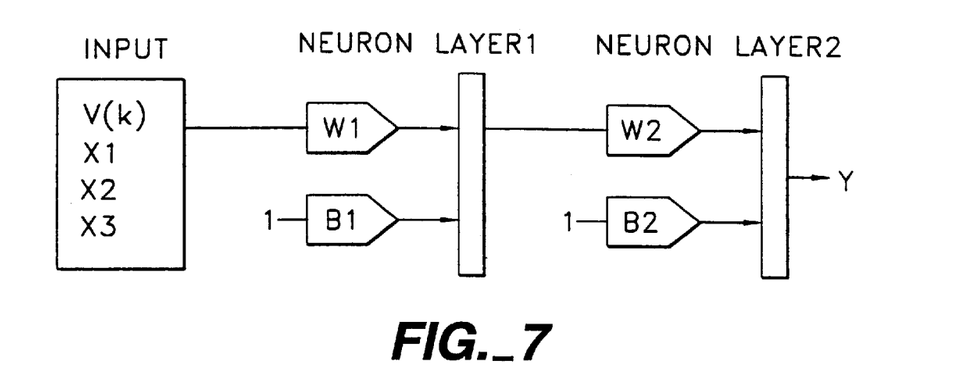
FIG. 7 is a schematic diagram showing the structure of a neural network according to the present invention.

FIG. 7 shows the neural network having the above structure. In FIG. 7, W1 represents a weight applied between an input layer and a hidden layer and W2 represents a weight applied between the hidden layer and an output layer. B1 and B2 represent biases respectively applied to the hidden layer and the output layer. In detail, B1 and B2 are constants input from the outside to increase the correctness of the learning, wherein the values of these constants are "1" in general.

Here, the hidden layer is constituted of one layer and has twenty input nodes. The final neural network has a structure as shown in FIG. 8.

The learning of the neural network having the input nodes and output node is performed using the output value from the supervisor TSK fuzzy model, obtained from the first step, according to a back propagation method.

Reference data of input nodes for the learning are values of input nodes a1, a2, a3 and a4 as measured values, and reference data of the output node is a difference value between the Y value and the Y' value, which is compared with the rotation velocity inferred from the fuzzy inference to reflect the degree of learning.

Figure 8:
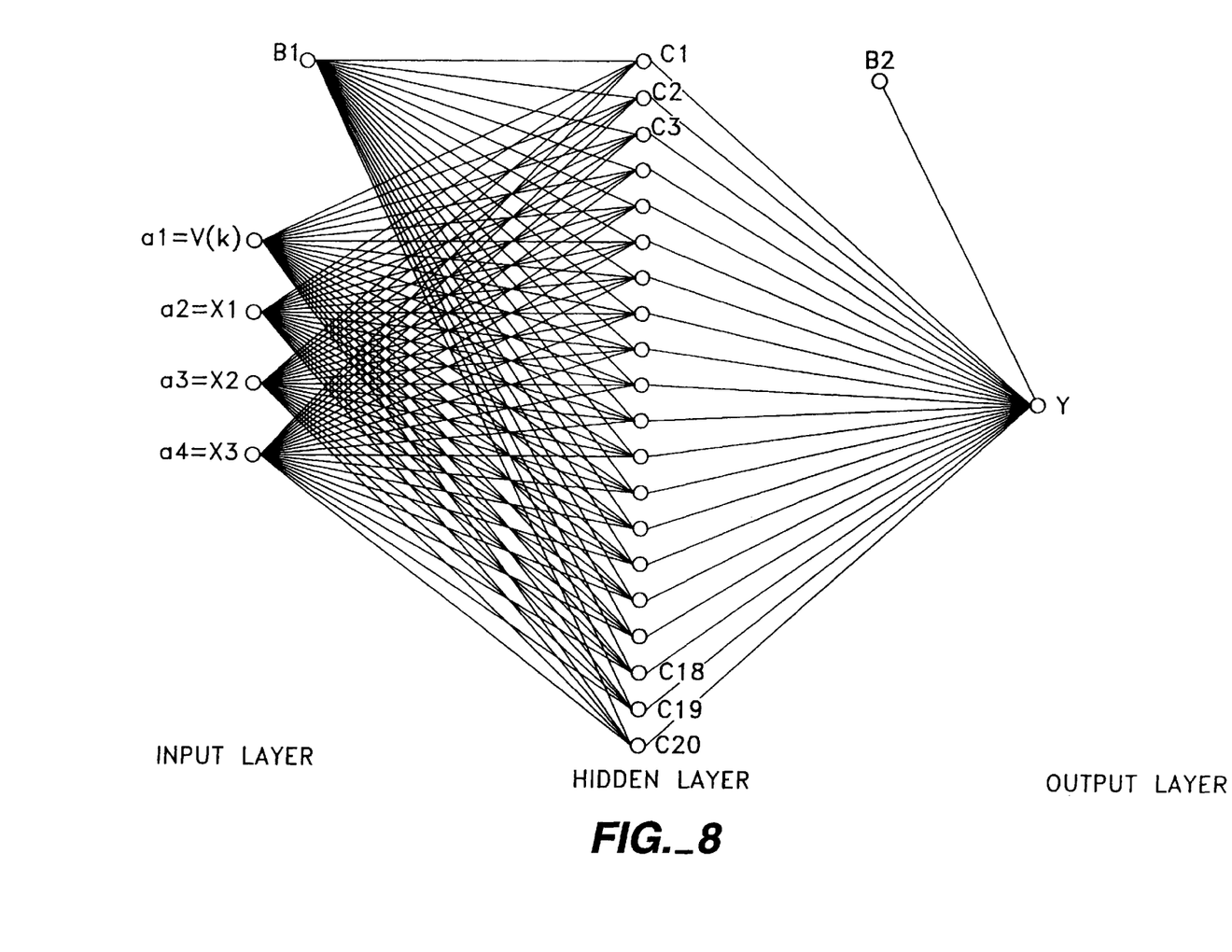
FIG. 8 shows the neural network of FIG. 7 in greater detail.

The relationship between the input nodes and the hidden nodes shown in FIG. 8 are as follows, obtained according to a general formula for the neural network.

$$c_1 = W^1{}_1 a1 + W^2{}_1 a2 + W^3{}_1 a3 + W^4{}_1 a4 - b^1{}_1$$

$$c_2 = W^1{}_2 a1 + W^2{}_2 a2 + W^3{}_2 a3 + W^4{}_2 a4 - b^2{}_1$$

$$c_3 = W^1{}_3 a1 + W^2{}_3 a2 + W^3{}_3 a3 + W^4{}_3 a4 - b^3{}_1$$

$$c_4 = W^1{}_4 a1 + W^2{}_4 a2 + W^3{}_4 a3 + W^4{}_4 a4 - b^4{}_1$$

$$c_5 = W^1{}_5 a1 + W^2{}_5 a2 + W^3{}_5 a3 + W^4{}_5 a4 - b^5{}_1$$

$$c_6 = W^1{}_6 a1 + W^2{}_6 a2 + W^3{}_6 a3 + W^4{}_6 a4 - b^5{}_1$$

$$c_7 = W^1{}_7 a1 + W^2{}_7 a2 + W^3{}_7 a3 + W^4{}_7 a4 - b^5{}_1$$

$$c_8 = W^1{}_8 a1 + W^2{}_8 a2 + W^3{}_8 a3 + W^4{}_8 a4 - b^5{}_1$$

$$c_9 = W^1{}_9 a1 + W^2{}_9 a2 + W^3{}_9 a3 + W^4{}_9 a4 - b^5{}_1$$

$$c_{10} = W^1{}_{10} a1 + W^2{}_{10} a2 + W^3{}_{10} a3 + W^4{}_{10} a4 - b^{10}{}_1$$

$$c_{11} = W^1{}_{11} a1 + W^2{}_{11} a2 + W^3{}_{11} a3 + W^4{}_{11} a4 - b^{11}{}_1$$

$$c_{12} = W^1{}_{12} a1 + W^2{}_{12} a2 + W^3{}_{12} a3 + W^4{}_{12} a4 - b^{12}{}_1$$

$$c_{13} = W^1{}_{13} a1 + W^2{}_{13} a2 + W^3{}_{13} a3 + W^4{}_{13} a4 - b^{13}{}_1$$

$$c_{14} = W^1{}_{14} a1 + W^2{}_{14} a2 + W^3{}_{14} a3 + W^4{}_{14} a4 - b^{14}{}_1$$

$$c_{15} = W^1{}_{15} a1 + W^2{}_{15} a2 + W^3{}_{15} a3 + W^4{}_{15} a4 - b^{15}{}_1$$

$$c_{16} = W^1{}_{16} a1 + W^2{}_{16} a2 + W^3{}_{16} a3 + W^4{}_{16} a4 - b^{16}{}_1$$

$$c_{17} = W^1{}_{17} a1 + W^2{}_{17} a2 + W^3{}_{17} a3 + W^4{}_{17} a4 - b^{17}{}_1$$

$$c_{18} = W^1{}_{18} a1 + W^2{}_{18} a2 + W^3{}_{18} a3 + W^4{}_{18} a4 - b^{18}{}_1$$

$$c_{19} = W^1{}_{19} a1 + W^2{}_{19} a2 + W^3{}_{19} a3 + W^4{}_{19} a4 - b^{19}{}_1$$

$$c_{20} = W^1{}_{20} a1 + W^2{}_{20} a2 + W^3{}_{20} a3 + W^4{}_{20} a4 - b^{20}{}_1$$

The relationship between the hidden nodes and the output node is as follows.

$$Y = w^1 c_1 + w^2 c_2 + w^3 c_3 + w^4 c_4 + w^5 c_5 + w^6 c_6 + w^7 c_7 + w^8 c_8 + w^9 c_9 + w^{10} c_{10} + w^{11} c_{11} + w^{12} c_{12} + w^{13} c_{13} + w^{14} c_{14} + w^{15} c_{15} + w^{16} c_{16} + w^{17} c_{17} + w^{18} c_{18} + w^{19} c_{19} + w^{20} c_{20} - b_2$$

Hereinafter, the third step for controlling the rotary blade to the inferred optimal rotation velocity will be described.

Figure 9:
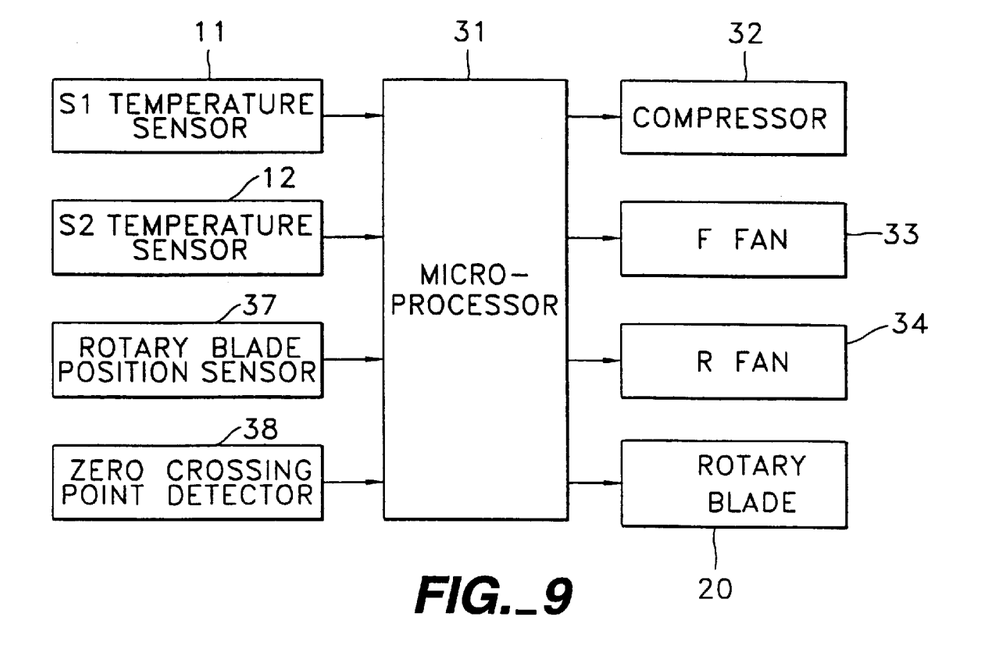
FIG. 9 is a block diagram of a temperature controlling apparatus according to the present invention.

FIG. 9 is a block diagram of a temperature controlling apparatus according to the present invention. The overall control in the refrigerator is performed by a microprocessor 31. S1 and S2 temperature sensors 11 and 12 sense the temperature within the refrigeration compartment to provide data of the changed temperatures which are required for the fuzzy inference. A rotary blade position sensor 37 senses the real rotation velocity of the rotary blade according to the change in the location of a rotary blade 20 to provide data required for more precisely controlling the rotation velocity of the rotary blade 20. An F fan 33 and an R fan 34 are cool air ventilation fans for a freezer compartment and refrigeration compartment, respectively. The microprocessor 31 controls the F and R fans 33 and 34 and a compressor 32, thereby controlling the overall operation in the refrigerator. A zero crossing point detector 38 will be described later.

Figure 10:
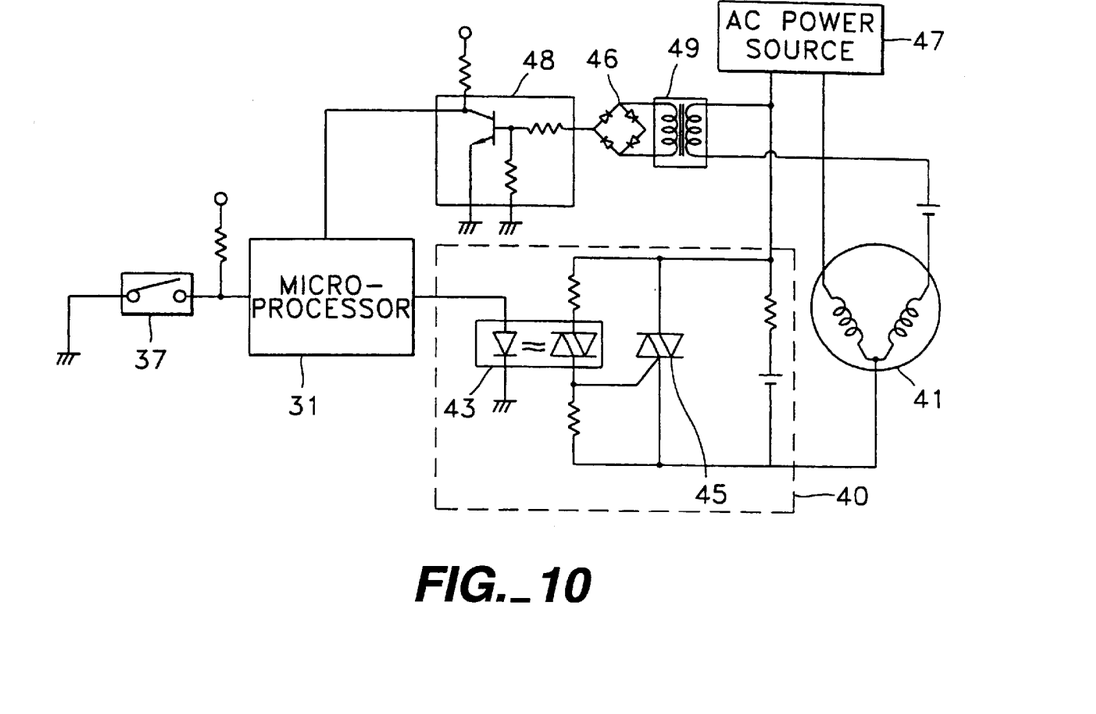
FIG. 10 is a circuit diagram of a rotation velocity controller for carrying out the method for controlling the rotation velocity of the rotary blade according to the present invention.

FIG. 10 is a circuit diagram of a rotation velocity controller for carrying out the method for controlling the rotation velocity of the rotary blade according to the present invention. The rotation velocity controller includes a driving motor 41, an AC power source 47 for providing an AC voltage applied to the driving motor 41, a transformer 49 for converting the voltage from the AC power source 47 into a small signal capable of being detected by the microprocessor 31, and a waveform cutting portion 40.

The microprocessor 31 has a fuzzy inference portion and a neural network portion to calculate an "equilibrium velocity", which indicates the rotation velocity of the rotary blade required to reach the equilibrium temperature, according to the temperatures sensed by the temperature sensors S1 and S2, and to control the rotation velocity based on the calculated equilibrium velocity.

Figure 11:
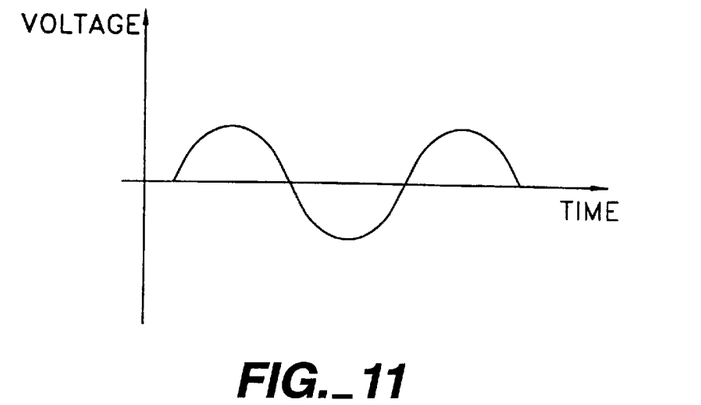
FIG. 11 is a graph showing the waveform of an alternating current (AC) power voltage.

The AC power source 47 provides power required for rotating the rotary blade 20. The voltage provided from the AC power source 47 is for rotating the rotary blade 20 at the maximum velocity, which has a sinusoidal waveform as shown in FIG. 11. The waveform cutting portion 40 cuts a predetermined interval of the voltage to control the effective value of the voltage applied to the driving motor 41, thereby controlling the rotation velocity of the rotary blade 20. The process for controlling the rotation velocity of the rotary blade 20 is as follows.

The voltage from the AC power source 47 is down-converted to a predetermined level via the transformer 49 to enable detection by the microprocessor 31. That is, the output voltage of the transformer 49 is in the magnitude of several volts. The voltage goes through a full-wave rectification by a bridge circuit 46 and then is applied to the microprocessor 31 via a transistor amplifier 48. The microprocessor 31 detects a zero crossing point from the waveform of the full-wave rectified voltage. Thus, the microprocessor 31 functions as the zero crossing detector 38 described above. The fuzzy inference portion of the microprocessor 31 outputs a temperature-equilibrating position having the highest temperature in the refrigeration compartment, into which cool air is discharged by rotating the rotary blade 20 for temperature equilibrium, according to the above final formula inferred based on the temperatures sensed by the temperature sensors S1 and S2. The microprocessor 31 calculates the effective value of the voltage to be applied to the driving motor 41 for rotating the rotary blade 20 at an "equilibrium velocity" which indicates the rotation velocity of the rotary blade required for discharging cool air to the equilibrium position.

FIG. 11 is a graph showing the waveform of the AC power voltage. In order to generate a voltage having the calculated effective value, a predetermined interval of the waveform shown in FIG. 11 is cut by the waveform cutting portion 40. The waveform cutting portion 40 includes an optical TRIAC 43 and a TRIAC 45. The TRIAC 45 is connected to the AC power source 47 and the driving motor 41 in series and receives the output from the optical TRIAC 43 as a gate signal. The optical TRIAC 43 generates the gate signal to be output to the TRIAC 45 by a trigger signal from the microprocessor 31.

Figure 12:
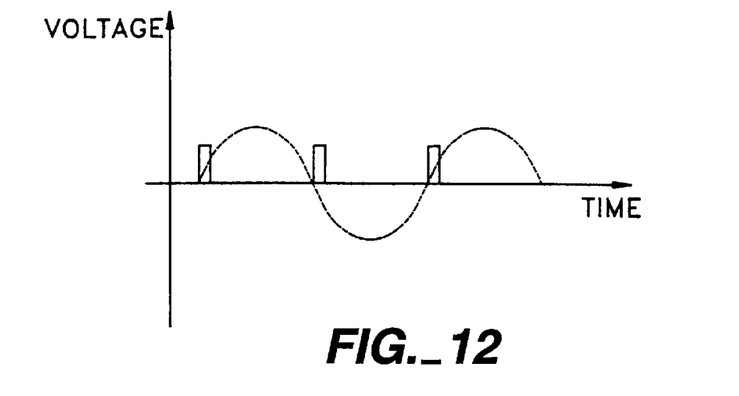
FIG. 12 is a graph showing the output waveform of zero crossing point detected by a zero crossing point detector.
Figure 13:
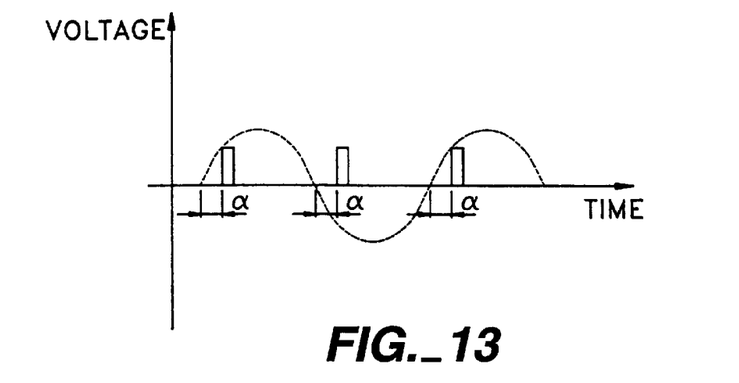
FIG. 13 is a graph showing a trigger signal, which is delayed by a predetermined interval ($\alpha$) from that of the waveforms of FIG. 12, generated by a microprocessor.
Figure 14:
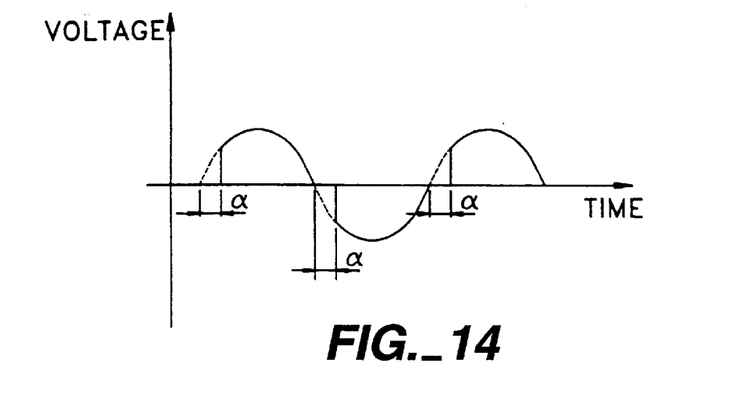
FIG. 14 is a graph showing the AC waveform cut off by a predetermined interval ($\alpha$), which is to be applied to a driving motor.

The microprocessor 31 determines a predetermined interval of the waveform to be cut from the zero crossing point and provides the optical TRIAC 45 with the trigger signal after a lapse of time corresponding to the cut interval. FIG. 12 is a graph showing the waveform output zero voltage (i.e, zero crossing point) detected by the zero crossing point detector. FIG. 13 is a graph showing the trigger signal generated from the microprocessor 31 after a predetermined time (α) is delayed from the zero crossing point of the waveforms of FIG. 12. The AC voltage applied to the TRIAC 45 is cut as shown in FIG. 14, by the interval α from the zero crossing point as shown in FIG. 13, so that the effective value of the voltage applied to the driving motor 41 is decreased. Accordingly, the rotation velocity of the rotary blade is decreased. As the equilibrium velocity calculated by the microprocessor 31 is low, the cut interval α is further increased. On the contrary, as the equilibrium velocity is high, the cut interval α is decreased, thereby increasing the rotation velocity of the driving motor 41.

The rotary blade position sensor 37 detects the angular position signals of the rotary blades by a predetermined time interval during the rotation of the rotary blade and then transmits the detected angular position signals to the microprocessor 31. The microprocessor 31 detects a change in the position of the rotary blade to calculate the real rotation velocity of the rotary blade, and then compares the calculated real rotation velocity with the equilibrium velocity. If the real rotation velocity is equal to the equilibrium velocity, the rotation velocity is maintained at the equilibrium velocity. Otherwise, the difference between the real rotation velocity and the equilibrium velocity is reflected to the equilibrium velocity. That is, when the real rotation velocity is faster than the equilibrium velocity, the interval α is increased to reduce the effective value of the power voltage, thereby reducing the real rotation velocity of the rotary blade. Meanwhile, when the real rotation velocity is slower than the equilibrium velocity, the interval α is decreased to increase the effective value of the power voltage, thereby increasing the real rotation velocity of the rotary blade. The rotation velocity of the rotary blade is more accurately controlled to reach the equilibrium velocity through the above feedback process.

As described above, in the temperature controlling method and apparatus for the refrigerator according to the present invention, temperatures of each portion are accurately inferred from a fuzzy model using the values of temperatures sensed by only a small number of temperature sensors and then the rotation velocity of the rotary blade is appropriately controlled according to the inferred positions into which the cool air is to be discharged. As a result, the cool air is appropriately discharged into each portion according to the distance between the rotary blade and a target position, so that the optimal temperature equilibrium is reached evenly throughout the refrigeration compartment.

What is claimed is:

1. A temperature controlling method for a refrigerator in which a cool air discharging velocity into a refrigeration compartment is controlled according to a rotation velocity of a rotary blade to evenly discharge cool air according to the distance from the rotary blade to a target portion to be cooled, said temperature controlling method comprising the steps of:

(a) constituting a fuzzy model for inferring the highest temperature portion among a plurality of portions within the refrigeration compartment;

(b) measuring changes in temperatures at a predetermined number of said portions;

(c) performing the fuzzy inference using the measured values of changes in temperatures based on the fuzzy model constituted in said step (a) to infer a temperature-equilibrating position into which the cool air is discharged and calculating the optimal equilibrium velocity of the rotary blade, the optimal equilibrium velocity required for discharging the cool air into the temperature-equilibrating position; and (d) controlling the rotation velocity of the rotary blade according to the equilibrium velocity calculated in said step (c).

2. A temperature controlling method for a refrigerator as claimed in claim 1, wherein said step (a) comprises the sub-steps of:

(a-1) providing data of the values in the temperature changes sensed by temperature sensors of the refrigeration compartment and distances from the rotary blade;

(a-2) performing a fuzzy division based on the data obtained in said step (a-1);

(a-3) selecting the optimal structure among a plurality of divided structures corresponding to the fuzzy-divided areas;

(a-4) calculating a linear formula for inferring the highest temperature portion based on the optimal structure selected in said step (a-3).

3. A temperature controlling method for a refrigerator as claimed in claim 1, wherein said step (d) comprises the sub-steps of:

(d-1) generating an AC voltage having an effective value corresponding to the maximum rotation velocity of the rotary blade;

(d-2) calculating an equilibrium voltage having an effective value corresponding to the equilibrium velocity;

(d-3) cutting the waveform of the AC voltage by a predetermined interval to generate the equilibrium voltage; and (d-4) applying the equilibrium voltage to a driving motor for driving the rotary blade.

4. A temperature controlling method for a refrigerator as claimed in claim 2, wherein said step (d) comprises the sub-steps of:

(d-1) generating an AC voltage having an effective value corresponding to the maximum rotation velocity of the rotary blade;

(d-2) calculating an equilibrium voltage having an effective value corresponding to the equilibrium velocity;

(d-3) cutting the waveform of the AC voltage by a predetermined interval to generate the equilibrium voltage; and (d-4) applying the equilibrium voltage to a driving motor for driving the rotary blade.

5. A temperature controlling method for a refrigerator as claimed in claim 3, wherein said step (d-3) comprises the sub-steps of:

(d-3-1) detecting a zero crossing point from the waveform of the AC voltage;

(d-3-2) calculating a delay time, during which the waveform of the AC voltage is to be cut to generate the equilibrium voltage, from the zero crossing point; and (d-3-3) cutting the waveform during the delay time calculated in said step (d-3-2) from the zero crossing point.

6. A temperature controlling method for a refrigerator as claimed in claim 5, further comprising the steps of:

detecting the real rotation velocity of the rotary blade;

calculating the difference between the real rotation velocity and the equilibrium velocity; and controlling the real rotation velocity of the rotary blade by reflecting the calculated velocity difference into the equilibrium velocity so that the real rotation velocity reaches the equilibrium velocity.

7. A temperature controlling apparatus for a refrigerator in which a cool air discharging velocity into a refrigeration compartment is controlled according to a rotation velocity of a rotary blade to distribute cool air according to the distance from the rotary blade to a target portion to be cooled, said temperature controlling apparatus comprising:

means for sensing change in temperatures at a predetermined number of portions within the refrigeration compartment;

fuzzy inference means for performing a fuzzy inference according to the temperature changes sensed by said temperature sensing means to infer an equilibrium velocity corresponding to the optimal rotation velocity of the rotary blade, the optimal rotation velocity required for maintaining temperature equilibrium within the refrigeration compartment; and means for controlling the rotation velocity of the rotary blade according to the equilibrium velocity.

8. A temperature controlling apparatus for a refrigerator as claimed in claim 7, wherein said controlling means comprises:

a power source for providing an AC voltage having an effective value corresponding the maximum rotation velocity of the rotary blade;

an equilibrium voltage generator for generating an equilibrium voltage having an effective value corresponding to the equilibrium velocity by cutting the AC voltage by a predetermined interval; and a driving motor for driving the rotary blade according to the equilibrium voltage.

9. A temperature controlling apparatus for a refrigerator as claimed in claim 8, wherein said equilibrium voltage generator comprises:

a zero crossing point detector for detecting a zero crossing point from the AC voltage;

a delay time calculator for calculating a delay time from the zero crossing point during which the waveform of the AC voltage is to be cut, to generate the equilibrium voltage; and waveform cutting means for cutting the waveform of the AC voltage from the zero crossing point during the delay time.

10. A temperature controlling apparatus for a refrigerator as claimed in claim 9, wherein said waveform cutting means comprises:

a TRIAC connected to said power source in series; and trigger means for applying a trigger signal to a gate port of said TRIAC after the delay time.

11. A temperature controlling apparatus for a refrigerator as claimed in claim 7, further comprising:

means for detecting the real rotation velocity of the rotary blade; and means for calculating the difference between the real rotation velocity and the equilibrium velocity, wherein said controlling means controls the real rotation velocity of the rotary blade by reflecting the difference into the equilibrium velocity.

12. A temperature controlling apparatus for a refrigerator as claimed in claim 8, further comprising:

means for detecting the real rotation velocity of the rotary blade; and means for calculating the difference between the real rotation velocity and the equilibrium velocity, wherein said controlling means controls the real rotation velocity of the rotary blade by reflecting the difference into the equilibrium velocity.

13. A temperature controlling apparatus for a refrigerator as claimed in claim 9, further comprising:

means for detecting the real rotation velocity of the rotary blade; and means for calculating the difference between the real rotation velocity and the equilibrium velocity, wherein said controlling means controls the real rotation velocity of the rotary blade by reflecting the difference into the equilibrium velocity.

14. A temperature controlling apparatus for a refrigerator as claimed in claim 10, further comprising:

means for detecting the real rotation velocity of the rotary blade; and means for calculating the difference between the real rotation velocity and the equilibrium velocity, wherein said controlling means controls the real rotation velocity of the rotary blade by reflecting the difference into the equilibrium velocity.

* * * * *